Oct. 21, 1930.                C. G. YOUNG                1,778,783
                    APPARATUS FOR LOADING EXPLOSIVES
                          Filed Feb. 2, 1929

Inventor
Cecil G. Young
By W. N. Roach
                                                  Attorney Patented Oct. 21, 1930

1,778,783

UNITED STATES PATENT OFFICE

CECIL G. YOUNG, OF DOVER, NEW JERSEY

APPARATUS FOR LOADING EXPLOSIVES

Application filed February 2, 1929. Serial No. 337,030.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is an apparatus for loading explosives.

In loading elements of fuses the sensitiveness of the explosive and the pressure exerted to obtain proper densities frequently give rise to accidental detonations which destroy the loading apparatus.

The purpose of this invention is to so construct and arrange the loading apparatus that the force of a detonation may be dissipated with injury to only a minor and inexpensive part of the apparatus.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein.

Figure 1:
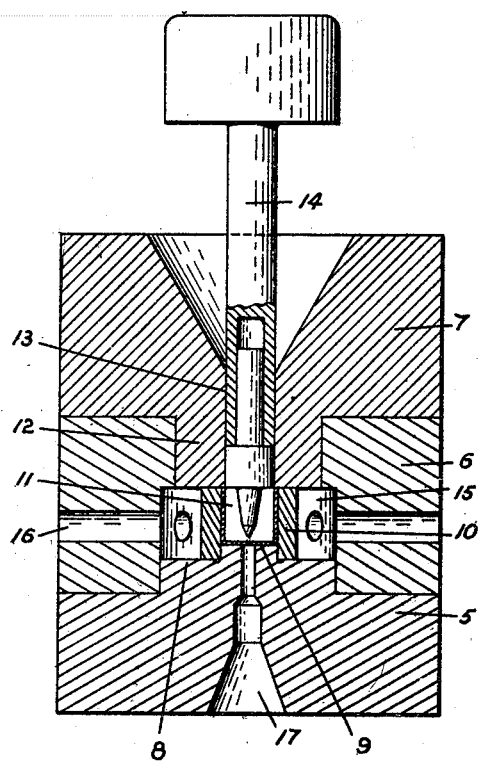
Fig. 1 is a longitudinal sectional view of the improved loading apparatus.
Figure 2:
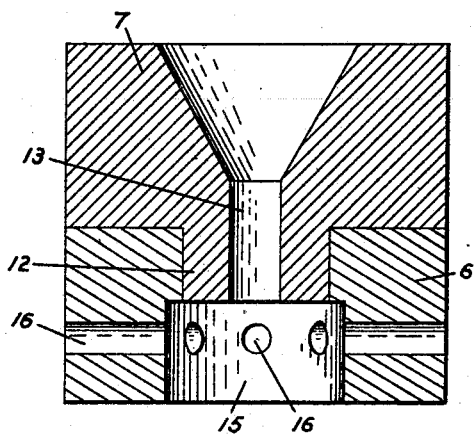
Figs. 2 and 3 are, respectively, a longitudinal sectional and an end view of the guide block.
Figure 3:
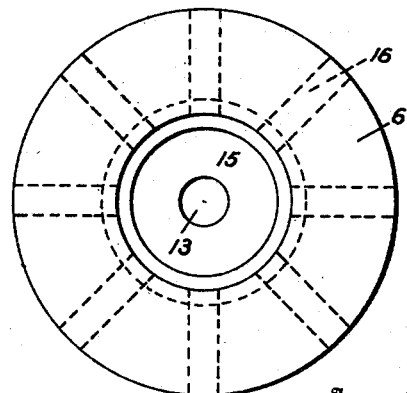

The apparatus consists essentially of three interfitted members, namely, a support block 5, a centering ring 6 and a guide block 7. The support block is formed with concentric steps, the base or larger step 8 serving to position the centering ring 6 and the smaller step 9 serving in a similar capacity to position a sleeve 10 which laterally confines the article 11 to be loaded and which is seated on the step 8.

The guide block 7 is formed with a central step 12 which is press-fitted in the centering ring 6 so that these two members may be removed as a unit to expose the upper face of the support block. If desired, they may be made as a single piece. When the centering ring is mounted on the support, the face of the step 12 contacts the upper end of the sleeve 10. An axial passage 13, flared at its outer end, is provided in the guide block to permit the introduction of an explosive and a ramming tool 14.

The opening in the centering ring is of sufficient diameter to provide a chamber 15 whose wall is spaced from the sleeve 10 and which is vented by means of passages 16 formed radially in the centering ring and also by means of an axial passage 17 in the support block. By virtue of these passages the force of a detonation accidentally occurring during loading will be dissipated and will result only in damage to the sleeve 10. Where the article to be loaded is in tubular instead of cup form the passage 17 in the support block may be reduced in size or entirely omitted.

I claim:

1. A loading apparatus for explosives including a stepped support block, a ring fitting thereon, a stepped guide block fitting in the ring and spaced from the support block to form a chamber, said guide block formed with a loading aperture, a sleeve fitted on a step of the support block and confined by the guide block and said ring formed with vent passages leading from the chamber.

2. A loading apparatus for explosives including a stepped support block, a ring fitting thereon, a stepped guide block fitting in the ring and spaced from the support block to form a chamber, said guide block formed with a loading aperture, a sleeve confined by the guide block and said ring formed with vent passages leading from the chamber.

3. A loading apparatus for explosives embodying inter-fitting members forming a chamber, means for venting the chamber, a sleeve confined by the members within the chamber and spaced from the wall of the chamber.

4. A loading apparatus for explosives embodying inter-fitting members forming a chamber, means for venting the chamber and a sleeve confined by the members within the chamber.

5. A loading apparatus for explosives embodying members forming a chamber, work holding means spaced from the wall of the chamber and means for venting the chamber.

6. A loading apparatus for explosives embodying members forming a chamber, work holding means in the chamber and means for venting the chamber.

7. A loading apparatus for explosives embodying assembled members forming a chamber within which is receivable an article containing an explosive and a member within the chamber for supporting the article in directions other than the direction of assembling of the members.

8. A loading apparatus for explosives embodying assembled members forming a chamber within which is receivable an article containing explosives, movable means for exerting a pressure on the explosive in the article and means for supportng the article in directions other than the direction of said pressure exerting means.

CECIL G. YOUNG.